Dec. 15, 1970   R. C. NEMETH   3,548,188
METHOD AND APPARATUS FOR MASS ANALYZING A GAS WHICH
IS SELECTIVELY DESORBED FROM A BODY
Filed May 6, 1969   2 Sheets-Sheet 2

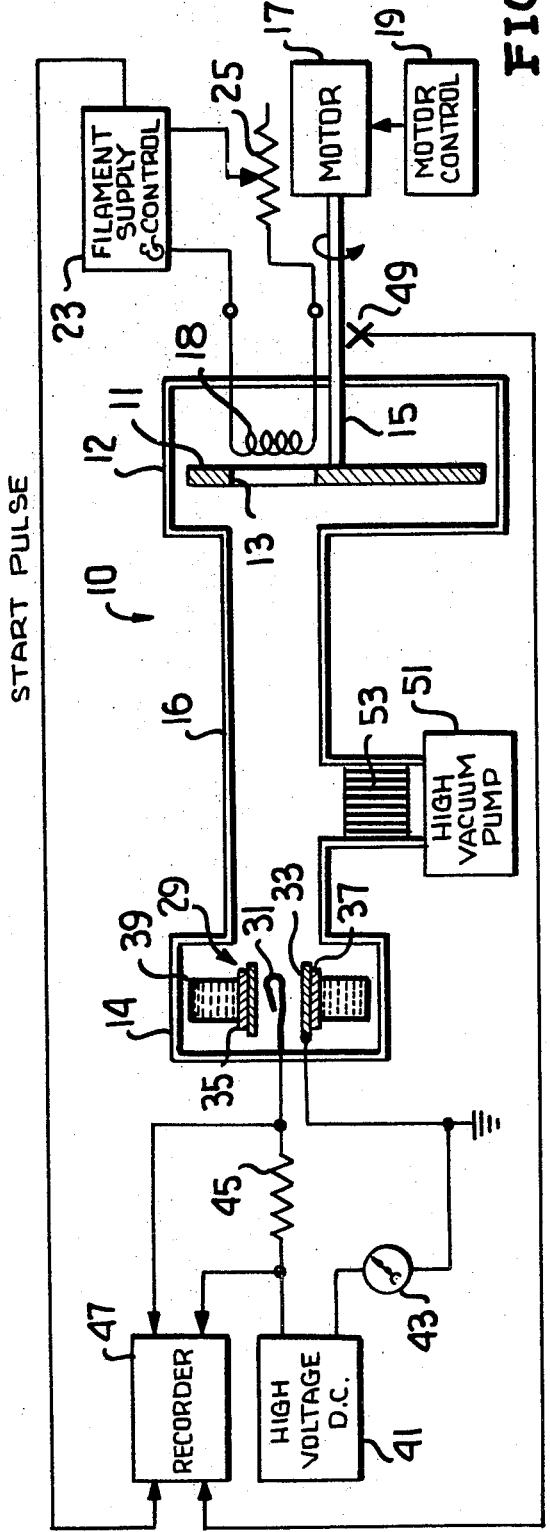
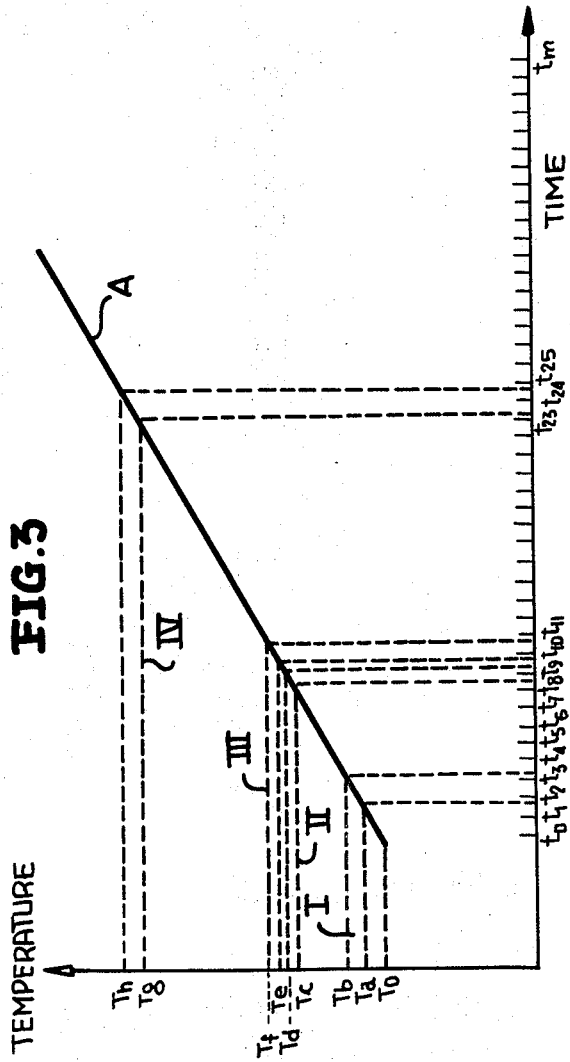
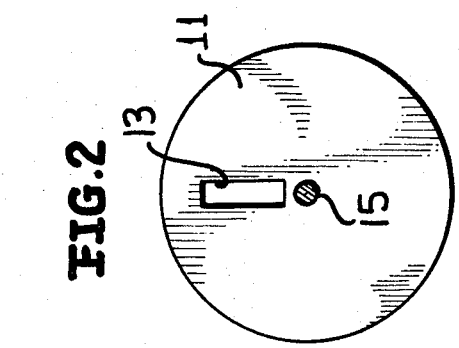

INVENTOR
ROBERT C. NEMETH

BY Hurvitz, Rose & Greene
ATTORNEY

United States Patent Office 3,548,188
Patented Dec. 15, 1970

3,548,188
**METHOD AND APPARATUS FOR MASS ANALYZ-
ING A GAS WHICH IS SELECTIVELY DESORBED
FROM A BODY**
Robert C. Nemeth, Huntington Station, N.Y., assignor to
Vacuum Instrument Corporation, Huntington Station,
N.Y., a corporation of New York
Continuation-in-part of application Ser. No. 707,338,
Feb. 21, 1968. This application May 6, 1969, Ser.
No. 822,223
Int. Cl. H01j 39/34
U.S. Cl. 250—41.9                    17 Claims

ABSTRACT OF THE DISCLOSURE

Analysis of material is achieved by distinguishing its constituent elements by their respective masses and desorption temperatures. The constituent elements of adsorbed material are selectively desorbed from a filament by controllably increasing the filament temperature. In one embodiment the desorbed molecules are periodically introduced into one end of a drift tube at recorded times corresponding to specified filament temperatures, the molecules traversing the drift tube at a speed determined by their respective masses. The arrivals of bunches of molecules at the other end of the tube are recorded in relation to their time of introduction into the drift tube to provide a correlation between the mass and desorption temperature of the molecules. In an alternative embodiment the desorbed molecules are periodically ionized at recorded times corresponding to specified filament temperatures, the resulting ions being accelerated in a mass spectrometer in which the ions of different masses are scanned across a single exit slit synchronously with the periodic ionization of the desorbed molecules. The ion current at the slit is recorded as a function of mass during each ionization period to correlate mass and desorption temperature of the desorbed molecules.

RELATED APPLICATIONS

This application is a continuation-in-part of application Ser. No. 707,338, filed Feb. 21, 1968, entitled "Means of Analysis of Matter," now abandoned.

BACKGROUND OF THE INVENTION

The present invention relates to analysis of material and more particularly to quantitative and qualitative analysis of material on the basis of the masses and desorption temperatures of its constituent elements.

The accuracy of prior art mass analyzers in identifying the constituent elements of a material has been limited where two or more elements of similar masses are part of the same material. The problem is one of mass resolution capability which generally cannot be improved without significant increases in cost and complexity. For example, in U.S. Pat. No. 2,499,020 to Fearon a drift tube type mass analyzer is disclosed in three embodiments having respective degrees of resolution capability. The highest degree of resolution capability achieved by Fearon requires three synchronized shutter mechanisms operating under extremely close and difficult-to-achieve frequency tolerances; even so, it is by no means clear that the Fearon system can distinguish between similar masses with the accuracy required in many present day applications.

The ion acceleration type mass spectrometer, as exemplified by the system in U.S. Pat. No. 2,659,821 to Hipple, also suffers from resolution deficiencies. In this type of system ions of different masses in an accelerated ion beam are dispersed first in an electrostatic field and then in a magnetic field, the latter being periodically varied to sweep the different mass components of the beam across an ion collector at known times. To achieve increased resolution in this apparatus one must increase the dispersion between ions of different masses, thereby requiring an increase in the size and complexity of the magnetic analyzer section of the spectrometer. Where space limitations and cost considerations are important, achieving the desired resolution often proves impractical.

Another approach to identifying constituents of a mixture is disclosed in U.S. Pat. No. 3,068,402 to Redhead who recognized the value of utilizing the characteristic desorption temperatures of different gases for identification purposes. In this approach a gas mixture for analysis is adsorbed on a filament located in a chamber, the temperature of the filament then being increased at a controlled rate to selectively desorb constituent gases at their respective characteristic desorption temperatures. Upon desorption of each constituent gas a corresponding partial pressure increase is experienced in the chamber and recorded as measured by an ionization gauge. Constituent gases are thus identified as a function of their desorption times which are readily related to filament temperature. This approach has resolution problems in the temperature sense; that is, difficulty is experienced in identifying elements of similar desorption temperatures. Redhead's approach to solving this problem is to apply the desorbed particles to a mass spectrometer adjusted to select ions of a first mass number. The desorption cycle is successively repeated with the spectrometer set to correspondingly different mass numbers. This approach permits resolution between two elements of similar desorption temperatures and different masses; however, in order to accurately scan the mass spectrum the desorption cycle must be repeated many times, hardly practical for most applications.

It is therefore an object of the present invention to permit determination of constituent elements in a mixture far more simply and with greater accuracy than possible in the prior art.

It is another object of the present invention to improve the resolution capability of mass spectrometers without unduly increasing their complexity.

It is still another object of the present invention to provide fast and simple means for analyzing a mixture for its constituent components by distinguishing said components on the bases of their masses and desorption temperatures.

It is still another object of the present invention to analyze the constituent components of a mixture by distinguishing said components on the bases of their masses and desorption temperatures and by utilizing only a single desorption cycle to completely analyze all components of said mixture.

SUMMARY OF THE INVENTION

In accordance with one aspect of the present invention I selectively desorb constituent components of a mixture at one end of a drift tube by controllably increasing the temperature of a filament on which the mixture is adsorbed. A shutter mechanism permits periodic flow of desorbed molecules down the drift tube, the downstream end of which is provided with an ionization pressure gauge and recorder. The velocity at which the molecules traverse the drift tube is determined by their respective masses and therefore a plot of the ionization gauge output signal versus time during each cycle of the shutter provides an indication of the masses of the desorbed molecules. The shutter duty cycle and operating frequency are set to permit the slowest molecule (greatest mass) presented for analysis to traverse the drift tube. In addition, the frequency of the shutter is preferably synchronized with the increasing filament temperature to assure that even the smallest range of filament temperatures over which a single element is desorbed overlaps two shutter cycles. Each shutter cycle therefore corresponds to a unique range of filament temperatures. After a single desorption cycle the recorded output indication permits unambiguous identification of the constituent components of the analyzed mixture. More specifically, the time at which a reading is registered during any one shutter cycle is a measure of the mass of the molecules producing that reading; in addition the shutter cycle in which a reading is registered indicates the desorption temperature of the molecule producing that reading; therefore, elements of like mass are distinguishable by their desorption temperatures and elements of like desorption temperature are distinguishable by their masses.

In another aspect of the present invention, molecules controllably desorbed from a filament are periodically ionized, accelerated, and introduced into a mass spectrometer in which the strength of the magnetic focusing field is periodically swept in synchronism with the periodic ionization of the desorbed molecules. The ionization frequency is selected so that at least one and preferably portions of two ionization cycles occur during even the smallest range of filament temperatures over which a single element is desorbed from the filament. Thus, during each ionization cycle, ions of elements having a known desorption temperature are beamed into the mass spectrometer and segregated according to mass by the swept magnetic focusing field. The recorded output, as is the case with the drift tube embodiment, permits elements to be distinguished on the basis of their mass and time of desorption.

BRIEF DESCRIPTION OF THE DRAWINGS

The above and still further objects features and advantages of the present invention will become apparent from consideration of the following detailed description of specific embodiments thereof, especially when taken in conjunction with the accompanying drawings, wherein:

FIG. 1 is a diagrammatic cross-sectional view of one embodiment of the present invention;

FIG. 2 is a plan view of a shutter employed in the embodiment of FIG. 1;

FIG. 3 is a plot of temperature versus time employed to illustrate the operation of the present invention;

DESCRIPTION OF PREFERRED EMBODIMENTS

Figure 4:
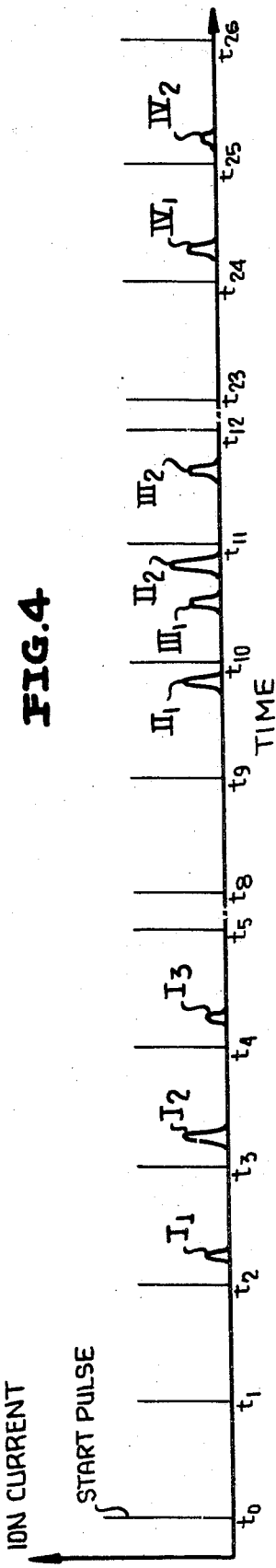
FIG. 4 is a plot of voltage versus time as might appear on a recording of the output signal in a typical operation sequence in the present invention.

Referring specifically to FIG. 1 of the accompanying drawings there is illustrated an elongated drift tube 10 having an upstream end 12, a downstream end 14, and an intermediate elongated section 16. Upstream end 12 is enlarged to accommodate an adsorber-desorber body such as filament 18 and a shutter 11 disposed between filament 18 and elongated section 16. The adsorber-desorber body may take other configurations, such as a strip, plate or disk, and is made from a refractory metal such as tungsten. Shutter 11, illustrated in plan in FIG. 2, is of circular configuration having a thin radially extending slit or window 13 defined therethrough. A shaft 15, driven by a motor 17, is secured to the center of shutter 11 and rotates the latter at some constant speed as determined by motor control unit 19 which controls the power applied to motor 17. Shutter 11 is positioned such that window 13 is aligned with filament 18 and elongated section 16 once during each revolution of the shutter.

Current is supplied to filament 21 from filament supply and control unit 23. This current is controllably variable, for example by means of series connected variable resistor 25, to provide control over the filament temperature. It is to be understood that the variable resistor schematically represents a current controller which may either be manually or automatically varied.

The downstream end 14 of tube 10 is enlarged to receive a cold cathode discharge gauge designated generally by the numeral 29. Gauge 29 comprises a loop anode 31 disposed in longitudinal alignment with the elongated portion 16 of tube 10 and filament 21 and surrounded by a cylindrical cathode 33, the inner wall of which is coated with titanium or a similar getter material. North and south pole pieces 35 and 37 respectively of a magnet provide a unidirectional magnetic field across the space between anode 31 and cathode 33. In addition the region surrounding gauge 29 is filled with a refrigerating agent 39 such as liquid nitrogen. High voltage, on the order of 3000–4000 volts is applied between anode 31 and grounded cathode 33 by means of a high voltage DC supply 41. The series circuit interconnecting high voltage supply 41 and the gauge electrodes also includes an ammeter 43 and a current-sensing resistor 45. A tape recorder 47 or other type of recording instrument is connected to record the voltage across resistor 45 as a function of time. In addition recorder 47 receives an input pulse once during each rotation cycle of shaft 15 by means of tachometer type connection designated by the numeral 49. Recorder 47 also receives a START pulse from filament control unit 23 whenever a desorption cycle is initiated.

A high vacuum pump 51 communicates with tube 10 through a metal labyrinth trap element 53 to permit evacuation of tube 10 to a pressure at least as low as $10^{-7}$ mm. Hg.

In operation, the material to be analyzed is adsorbed on filament 18 by any one of a number of conventional techniques. One such technique is described in U.S. Pat. No. 3,068,402 to Redhead wherein the filament is cleaned by heating it with a high current to drive off any impurities. The filament is then cooled by refrigeration in the presence of the material to be analyzed for a predetermined time to permit a layer or layers of the material to cover the filament.

After tube 10 has been evacuated by pump 51, analysis of the material adsorbed on filament 18 may begin. The temperature of filament 18 is slowly raised according to a predetermined time function by slowly increasing the filament current. Preferably though not necessarily, the temperature rise is made linear with respect to time, requiring therefore that the filament current be increased as a square law function with respect to time. For example, if the desorption cycle is intended to last for one minute, during which the filament temperature is linearly increased between 293° K. and 2100° K., the temperature is varied at about 30° per second. Initiation of the filament heating cycle is registered at recorder 47 by a START puplse received from filament control unit 23.

As the filament temperature increases it gradually coincides with individual desorption temperature ranges over which respective constituent component of the analyzed material are desorbed from the filament. During each passage of window 13 in front of filament 18, molecules desorbed from the filament are permitted entry into elongated section section 16 of drift tube 10. These molecules traverse the drift tube at speeds determined by their masses, the molecules of lesser mass reaching the downstream end 14 of the tube before molecules of greater mass. The precise timing relationship between the filament temperature increase and the speed of shutter 11 is discussed below; for immediate purposes it need only be understood that the molecules permitted to traverse tube 10 during each pass of window 13 can be identified with a specific small range of filament temperatures.

Molecular pressure at gauge 29 causes electrical discharge between anode 31 and cathode 33, ionizing the molecules. The discharge current magnitude is a function of the molecular pressure magnitude at gauge 29 and hence of the number of molecules in the region of gauge 29. Molecules of like masses tend to bunch while traversing tube 10 so that the discharge current magnitude produced by each bunch of molecules is a quantitative measure of the amount of material of like mass desorbed from filament 18 during a given shutter cycle. In addition the times at which discharge current surges occur in each shutter cycle serve as a qualitative measure of the masses desorbed during that cycle; this is because the time required for a molecule to traverse tube 10 is a function of the mass of the molecule.

The magnetic field created between pole pieces 35 and 37 serves to induce a spiral motion in the electrons travelling between anode 31 and cathode 33 in gauge 29. The spiral motion induces collisions between these electrons and any un-ionized molecules of the same bunch. The collisions induce ionization of the un-ionized molecules thereby maximizing the ionization efficiency of the gauge. The spiralling ions are then collected by the Titanium getter at cathode 33 to quickly remove the ions from the ionization region before the next molecule bunch arrives. This quick removal of ions from the gauge discharge region lowers the residual or ambient pressure at gauge 29. Further lowering of the ambient pressure at gauge 29 is achieved by the liquid nitrogen bath 39 surrounding the gauge, which by cooling the gauge environment effectively lowers the ambient pressure. The low ambient pressure at gauge 29 renders it more sensitive to small bunches of molecules.

A true appreciation of the significance of the present invention may best be gained by referring to FIG. 3 to be discussed presently and FIG. 4 to be discussed thereafter. FIG. 3 represents a plot of temperature versus time; more specifically, curve A, illustrated by way of example as a straight line, represents the temperature T of filament 18 at any time during a typical desorption cycle. The starting temperature $T_0$ for the cycle occurs at time $t_0$ and the filament temperature $T_m$ at the end of the cycle occurs at time $t_m$. The regular time intervals indicated on the time scale between $t_0$ and $t_m$ are representative of individual cycles or revolutions of shutter 11. These intervals are bounded by timing spikes, $t_1$ through $t_{m-1}$, which represent the interval of time during each shutter cycle during which window 13 is aligned with filament 18 and elongated section 16 of tube 10. Therefore, it is only during this small portion of each shutter cycle, namely the time period of the individual spikes that molecules desorbed from filament 18 are permitted entry to section 16 of the tube.

On the temperature scale there are various shaded regions indicated. These represent tempertures ranges over which typical individual constituent components of the analyzed material are desorbed from filament 18. If, for example, the analyzed material has four specific constituent components, I, II, III and IV, they would have four respective desorption temperature ranges as indicated in FIG. 3. More specifically, component I is desorbed over a temperature range bounded by temperatures $T_a$ and $T_b$; element II is desorbed over a temperature range bounded by temperatures $T_c$ and $T_e$; the desorption range for element III is bounded by $T_d$ and $T_f$; and the desorption range of element IV is bounded by $T_g$ and $T_h$. The overlapping of the desorption temperature ranges for elements II and III is to be noted because, as will be described below, the present invention is able to distinguish between elements II and III in spite of the overlap.

Synchronization between the time rate of filament temperature increase and the frequency of shutter 11 is required. More specifically, at least one and preferably portions of two shutter cycles occur within even the smallest desorption temperature ranges. This requires that the shutter cycles be shorter than the time on curve A corresponding to the smallest desorption temperature range for any element to be detected. In addition the frequency of the shutter must be sufficiently low to permit all molecules of all masses of interest to traverse tube 10 during a single shutter cycle. This latter requirement assures that heavy molecules emitted through window 13 in one shutter cycle will not be overlapped by lighter molecules emitted through window 13 during the next shutter cycle.

FIG. 4 represents a typical time record of a desorption cycle as might be produced by recorder 47. The horizontal scale represents time and is broken up as necessary to permit illustration of only those shutter cycles having relevance to elements I, II, III and IV in FIG. 3. Specifically only the intervals including $t_0$ through $t_5$, $t_8$ through $t_{12}$, and $t_{23}$ through $t_{26}$ are illustrated. The shutter cycles are marked by the pulses received from tachometer arrangement 15. The START pulse received from control unit 23 signifies initiation of a desorption cycle. The pulses occurring within the various time intervals represent ionization current surges through gauge 29.

Examining a typical desorption cycle for the system of FIG. 1, with the aid of FIGS. 3 and 4, it is noted that the filament temperature during the time interval between window-passes (spikes) $t_0$ and $t_1$ does not coincide with a desorption temperature range for any constituent component of the material for analysis adsorbed on filament 18. Consequently, no molecules are desorbed during this time interval. Since no molecules are desorbed during or before time $t_1$, no molecules traverse drift tube 10 during the time interval between $t_1$ and $t_2$. Correspondingly no current surges appear through gauge 29 in the intervals between $t_0$ and $t_2$. However, between $t_1$ and $t_2$ the filament temperature reaches the lower temperature limit, $T_a$, of the desorption temperature range for element I; consequently, element I begins to desorb from filament 18 during this interval. Desorbed molecules of element I are initially prevented from traversing tube 10 by shutter 11 because window 13 is not aligned with both filament 18 and tube section 16 at the time of initial desorption. At window-pass time $t_2$ the accumulated desorbed molecules of element I are permitted entry into section 16 of tube 10 and traverse the tube at a velocity dependent upon the mass of element I. The molecules of element I have the same mass and therefore arrive at gauge 29 in a bunch which causes an ionization discharge between anode 31 and cathode 33. The discharge is registered at meter 43 and recorder 47, the latter registering a pulse $I_1$ having an amplitude representing the magnitude of the discharge current; the time at which the discharge occurred is easily obtained in the recorded output of FIG. 4 relative to spike or window-pass $t_2$. The spikes or window-passes, as described above, are fed to recorder 47 by means of tachometer arrangement 49. For the reasons previously described, the time delay between spike $t_2$ and the recorded discharge current pulse $I_1$ is a measure of the mass of element I. The presence of the discharge current pulse in the recorded time interval between spikes $t_2$ and $t_3$ is indicative of the desorption temperature of element I; more specifically, the desorption temperature of element I must be somewhere in the range of temperatures on curve A which correspond to the time interval between times $t_1$ and $t_2$ since element I was desorbed from filament 18 between times $t_1$ and $t_2$. With its mass and desorption temperature known, element I can be readily identified.

The desorption temperature range for element I on curve A extends past time $t_3$ and into the time interval between times $t_3$ and $t_4$. Consequently during the window-passes at times $t_3$ and $t_4$ desorbed molecules of element I traverse tube 10 and result in current pulse $I_2$ and $I_3$ being recorded at recorder 47 as indicated in FIG. 4. The relative amplitudes of current pulses $I_1$, $I_2$, and $I_3$ represent the relative proportions of element I traversing tube 10 during each of the three shutter cycles between times $t_2$ and $t_5$. The combined amplitudes of pulses $I_1$, $I_2$, and $I_3$ represent the total amount of element I present in the analyzed material and can be compared to the combined amplitudes of current pulses representing element II, III and IV to give a quantitative measure of the percentage of element I in the analyzed material.

In the typical sequences being considered, no molecules are desorbed from filament 18 during the time intervals between $t_4$ and $t_8$; consequently, no current pulses appear in the recorded shutter cycles between $t_5$ and $t_9$. However, between $t_8$ and $t_9$ the filament temperature reaches $T_c$, the lower limit of the desorption temperature range for element II. Thus, during the window-pass at time $t_9$ desorbed molecules of element II are admitted into section 16 of tube 10 and traverse tube 10 at a velocity dependent upon their mass. It is assumed that element II has a greater mass than element I and therefore traverses tube 10 with a slower velocity than did element I. Consequently, the time interval between $t_9$ and the first current pulse $II_1$ from element II is greater than the time interval between time $t_2$ and pulse $I_1$ (and, of course, between time $t_3$ and pulse $I_2$ as well as between $t_4$ and pulse $I_3$).

During the time interval between $t_9$ and $t_{10}$ the filament temperature reaches $T_d$, the lower limit of the desorption temperature for element III. Thus, molecules of both elements II and III are desorbed during this time interval. Also during this time interval the filament temperature reaches $T_e$, the upper limit of the desorption temperature range of element II; therefore, some time after desorption of element III begins desorption of element II terminates. During the window-pass at time $t_{10}$, desorbed molecules of both element II and III are permitted entry into tube section 16 and traverse the tube at velocities determined by their masses. It is assumed that element III has a lesser mass than element II and therefore the bunch of element III molecules arrive at gauge 29 and are registered as pulse $III_1$ by recorder 47 before pulse $II_2$ representing the bunch of element II molecules. Thus, in spite of the similar desorption temperatures of elements II and III, they are readily distinguishable by their different masses.

During the time interval between $t_{10}$ and $t_{11}$ element III continues to desorb from filament 18 until temperature $T_f$ is reached. Consequently during the next window-pass at $t_{11}$, desorbed molecules of element III enter section 16 of tube 10, traverse the tube, and produce a current pulse $III_2$ at the recorder. One may compare the combined amplitudes of pulses $II_1$ and $II_2$ to the combined amplitudes of pulses $III_1$ and $III_2$ to obtain relative quantities of these two elements present in the analyzed material. In the chosen example there is approximately twice as much element II as there is element III in the analyzed material. Similar comparisons can be made to determine relative quantities of elements I, II, III and IV.

No further desorption occurs until the time interval between $t_{23}$ and $t_{24}$ wherein temperature $T_g$ is attained. $T_g$ is the lower limit of the desorption temperature range for element IV, molecules of which begin to desorb from the filament during this time interval. It is assumed that elements I and IV have the same masses and therefore the time between time $t_{24}$ and the first current pulse $IV_1$ produced by element IV is the same as the time interval between time $t_2$ and current pulse $I_1$. However, since elements I and IV have different desorption temperatures, their similar masses do not prevent their distinct identification by the system of FIG. 1.

Between times $t_{24}$ and $t_{25}$ the filament temperature reaches the upper limit, $T_h$, of the desorption temperature range of element IV. The molecules desorbed between $t_{24}$ and the time $T_h$ is reached are admitted into section 16 at time $t_{25}$ and produce current pulse $IV_2$ at the recorder.

Figure 5:
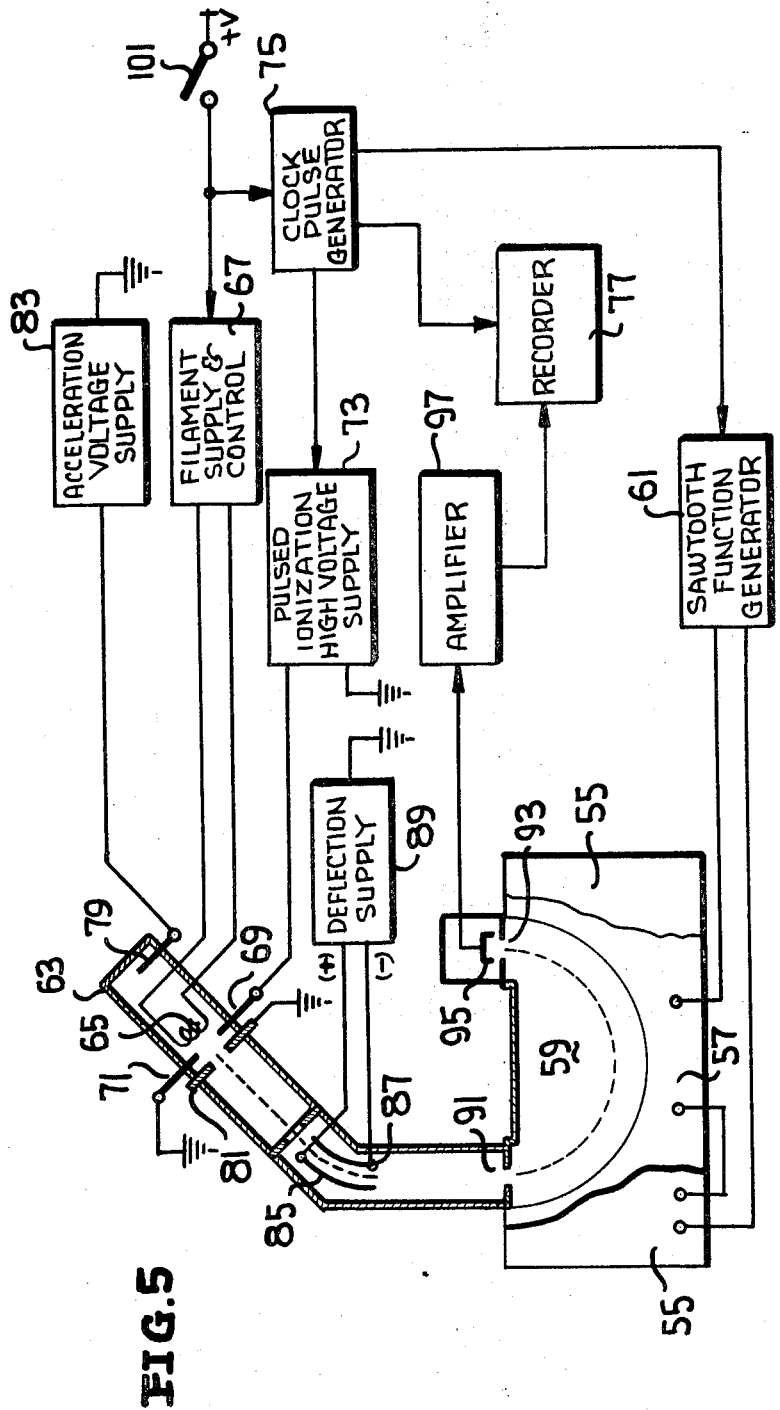
FIG. 5 is a diagrammatic cross-sectional view of a second embodiment of the present invention.

The above description indicates the simplicity of quantitative and qualitative analyses when performed with the apparatus of the present invention. A single desorption cycle lasting on the order of one or a few minutes is sufficient to provide a complete and comprehensive analysis of material adsorbed on the filament. Similarly, simple analysis is possible with the apparatus illustrated in FIG. 5 which functions using similar principles to the apparatus of FIG. 1, the main difference being in the technique by which masses are distinguished. In FIG. 5 a mass spectrometer, for example of the type described and illustrated in U.S. Pat. No. 2,659,821, is employed to distinguish between the masses of selective desorbed molecules. The mass spectrometer comprises a pair of magnetic poles and associated coils 55 and 57 for providing a magnetic field across a magnetic analyzer section 59 of the spectrometer. The coils are energized by a sawtooth function current source 61 which varies the magnetic field intensity in section 59 as a sawtooth function of time.

Upstream of the magnetic analyzer section 59 is a metal housing 63 having supported near the upstream end thereof a filament 65 of the same general type as filament 18 of FIG. 1. A filament supply and control unit 67 is adapted to provide a gradually increasing current to filament 65 in the same manner as unit 23 controls filament 18 in FIG. 1. The preferable mode of control is a linear increase of filament temperature 65 as a function of time.

Molecules desorbed from filament 65 are periodically ionized by an ionization arrangement comprising, by way of example only, a pair of spaced ionization electrodes 69 and 71. Electrode 69 is supplied with periodic high voltage pulses by a pulsed ionization high voltage supply unit 73; electrode 71 is grounded. High voltage supply 73 is fed by periodic clock pulses from clock pulse generator 75. The latter generates a train of pulses at a fixed frequency which periodically trigger supply 73 and therefore provide an ionization discharge between electrodes 69 and 71 corresponding to each clock pulse. The clock pulses are also fed to sawtooth function generator 61 and a recorder 77 for purposes of synchronization to be described in greater detail below. A pair of ion-accelerating electrodes 79 and 81 are provided in housing 63; electrode 79 is disposed upstream of filament 65 and grounded electrode 81 is downstream thereof. Accelerating voltage is applied from acceleration voltage supply 83. The acceleration field produced between electrodes 79 and 81 is maintained steady.

An electrostatic analyzer section is located downstream of electrode 81 and comprises a pair of curved deflection plates 85 and 87 which are supplied with a DC voltage by deflection supply 89. The electrostatic analyzer section turns the ions accelerated through housing 63 through a forty-five degree angle and results in the ions being directed toward a slit 91 at the entrance to the magnetic analyzer section 59. Ion deflection at the electrostatic analyzer section distributes the ions transversely to their direction of acceleration in such a way that only ions lying within a definite predetermined energy range appear across slit 91. The ions having the lowest energy appear at the right side of slit 91 (as viewed in FIG. 5) and those having the highest energy at the left side of slit 91. Ions passing through slit 91 enter the magnetic analyzer section 59. As is well known in the mass spectrometer art, these ions are subjected to a magnetic field which causes the ions to traverse the magnetic analyzer section in semicircular trajectories, the diameters of which depend upon the masses of ions. A single exit slit 93 is disposed diametrically across the magnetic analyzer from entrance slit 91 and receives therethrough ions of a predetermined mass in accordance with the strength of the magnetic field appearing thereacross. An ion collector 95 receives ions egressing from the magnetic analyzer via slit 93 to provide an ion current having a magnitude which is proportional to the number of received ions. The ion current is amplified at amplifier 97 and delivered to recorder 77 for registration.

By employing a sawtooth current function from generator 61 to energize coils and poles 55, 57, the ions traversing the magnetic analyzer section 59 are in effect swept across the exit slit 93. More specifically at different magnetization current levels, ions of different masses are directed through slit 93. Since the current from generator 61 as a function of time is known, the time at which ions are received by collector 95 in each cycle of function generator 61 identifies the mass of these ions.

Synchronization of the various components of the system in FIG. 5 is achieved by means of clock pulse generator 75. More specifically, each clock pulse performs the following functions: (1) it actuates ionization supply 73 to effect an arc discharge pulse between ionization electrodes 69 and 71; (2) it recycles the sawtooth function generator 61; (3) it is registered at recorder 77 to demark the various ionization cycles which aggregately comprise a desorption cycle. A desorption cycle is initiated by actuation of a start switch 101 which then applies an actuation voltage to both the filament control unit 67 and clock pulse generator 75; the filament control unit 67 then begins increasing the temperature of filament 65, preferably as a linear function of time, and the clock pulse generator 75 begins supplying clock pulses as described.

As was the case with the system of FIG. 1, a desorption cycle is determined by the time required for the temperature of filament 65 to traverse all the desorption temperature ranges of interest. The frequency of the clock pulse generator is related to the desorption cycle period in the same way that the shutter frequency in FIG. 1 is related to the desorption cycle period. More specifically, at least one and preferably portions of two ionization cycles occur within even the smallest desorption temperature ranges. In addition, the function generator 61 must be permitted to sweep all masses of interest across slit 93 once during each ionization cycle.

Timing and recording for the system of FIG. 5 is similar to that of the system of FIG. 1 and consequently FIGS. 3 and 4 are applicable to a description of the operation of the system of FIG. 5. In FIGS. 3 and 4 the various spikes ($t_0$ through $t_m$) may represent the clock pulses provided by clock pulse generator 75. The temperatures $T_a$ through $T_h$ in FIG. 3 represent the various desorption temperature range boundaries for four typical constituent element I, II, III and IV of a material to be analyzed; the current pulses $I_1$, $I_2$, etc. in FIG. 4 represent the ion current recorded at recorder 77, their relative time positions in the various ionization cycles being a measure of the mass of the ions producing the current pulse.

Because of the great similarity between the applicability of FIGS. 3 and 4 to the system of FIG. 1 and their applicability to the system of FIG. 5, a detailed description of their applicability to the system of FIG. 5 is not necessary. It is important to understand however that the temperature of filament 65 is continuously increased during a desorption cycle and that molecules desorbed from the filament since the previous clock pulse are ionized at the next clock pulse and immediately accelerated into the magnetic analyzer section. The sawtooth current function provided by generator 61 is recycled by each clock pulse so that ions entering magnetic analyzer 59 during each ionization cycle are received at collector 95 at specified times in that cycle which are dependent upon the masses of the ions. Thus element I begins to be desorbed from filament 65 some time after clock pulse $t_1$ but before clock pulse $t_2$. The ionization discharge resulting from clock pulse $t_2$ ionizes the desorbed molecules which are then accelerated into magnetic analyzer 59. The strength of the magnetic field appearing across the magnetic analyzer is gradually increased by generator 61 during each ionization cycle and at some time attains a strength required to direct ions having the mass of element I into exit slit 93. Current pulse $I_1$ is recorded at this time, its time of occurrence after clock pulse $t_2$ affording an indication of the mass of the ions producing the pulse. In addition, as was the case with the system of FIG. 1, the amplitude of pulse $I_1$ is a quantitative measure of the number of molecules of element I desorbed from filament 65 during the time interval between clock pulses $t_1$ and $t_2$. Recordation of pulse $I_2$, $I_3$, $II_1$, $II_2$, $III_1$, $III_2$, $IV_1$ and $IV_2$ proceeds in a manner similar to that described for pulse $I_1$ and with the inter-related timing relationships described above for the system of FIG. 1.

The particular configuration of the mass spectrometer of FIG. 5 is not crucial to the present invention. In fact, any system capable of cyclic mass analysis as elements are desorbed may be employed.

While I have described and illustrated specific embodiments of my invention, it will be clear that variations of the details of construction which are specifically illustrated and described may be resorted to without departing from the true spirit and scope of the invention as defined in the appended claims.

I claim:
1. The method of determining constituent components of a material to be analyzed comprising the steps of:
  selectively desorbing said constituent components of said material from a body on which said material is adsorbed by gradually increasing the temperature of said body as a known function of time over a predetermined desorption time interval and over a temperature range which encompasses the desorption temperatures of said constituent components;
  analyzing the masses of desorbed constituent components at plural specified times during said desorption time interval, the analysis performed at each of said specified times indicating the masses of all constituent components desorbed from said body since the immediately previous specified time.

2. The method according to cliam 1 wherein said plural specified times occur at regular intervals during said desorption time interval.

3. The method according to claim 2 wherein each of said constituent components desorb from said body over a respective range of desorption temperatures, and wherein said specified times are sufficiently proximate in time to assure at least two mass analyses of each of said constituent components during said desorption time interval.

4. The method according to claim 3 wherein said specified times are sufficiently spaced in time to permit completion of the previous analysis before the next analysis is initiated.

5. The method according to claim 4 wherein the step of analyzing the masses of desorbed constituent components at each specified time includes providing an energy pulse at a time after said specified time which is a known function of the mass of each analyzed constituent component, recording each energy pulses in time relationship to said specified time, and recording the time of initiation of said desorption time interval.

6. The method according to claim 5 wherein the step of providing an energy pulse includes causing desorbed molecules to traverse a drift tube at said specified times, the velocity at which each desorbed molecule traverses said drift tube being a function of its mass, and ionizing molecules which traverse the drift with an ionization discharge, said ionization discharge providing said energy pulse.

7. The method according to claim 6 wherein the magnitude of said ionization discharge is a function of the number of molecules ionized thereby.

8. The method according to claim 5 wherein the amplitude of each energy pulse is a measure of the quantity of the desorbed constituent component producing that energy pulse.

9. The method according to claim 5 wherein the step of providing an energy pulse includes ionizing desorbed molecules in a mass spectrometer at said specified times, accelerating the ionized molecules into a magnetic field in which the ionized molecules follow differing trajecties as a function of their masses, cyclically varying the strength of said magnetic field as a predetermined function of time at a frequency equal to the frequency of said specified times so that ionized molecules of all masses of interest traverse a predetermined trajectory once during each magnetic field strength cycle, and collecting ions traversing said predetermined trajectory to provide said energy pulses.

10. Apparatus for determining constituent components of a material adsorbed on a body comprising:

means for selectively desorbing said constituent components in molecular form from said body, said means comprising controlled heating means for gradually increasing the temperature of said body as a known function of time over a predetermined desorption time interval and over a temperature range which encompasses the desorption temperatures of said constituent components;

analyzer means for analyzing molecules introduced thereinto and indicating the masses of said molecules by providing an output pulse of energy for each mass analyzed at a time after introduction of said molecules thereinto which is a function of the masses of the introduced molecules;

timing means for periodically and at specified times during said desorption time interval introducing molecules desorbed from said body into sand analyzer means, the molecules so introduced at any specified time being those desorbed from said body since the previous specified time;

whereby the time of each of said output pulses relative to the time of initiation of said desorption time interval is a measure of the desorption temperature of the constituent component whose molecules produce that pulse and wherein the time of each of said output pulses relative to the closest preceeding specified time is a measure of the mass of the constituent component whose molecules produce that pulse.

11. The apparatus according to claim 10 wherein said constituent components desorb from said body over respective desorption temperature ranges and wherein said specified times are sufficiently proximate one another in time to assure that at least one of said specified times occur during the times when the temperature of said body lies within said respective desorption temperature ranges.

12. The apparatus according to claim 10 wherein said analyzer means comprises a drift tube having an upstream end in which said body is located, a downstream end, an elongated section extending between said upstream and downstream ends and through which molecules introduced into said upstream end travel in a downstream direction at speeds determined by their respective masses, and output means disposed in the downstream end of said tube for providing said output energy pulses as a function of the molecular pressure at the downstream end of said drift tube; and wherein said timing means comprises cyclically operative shutter means for permitting molecules desorbed from said body to pass from said upstream end into said longitudinal section of said drift tube at said specified times.

13. The apparatus according to claim 12 wherein said output means comprises an ionization pressure gauge surrounded by a liquid refrigerant to lower the residual pressure at said gauge.

14. The apparatus according to claim 13 wherein said body is a filament of refractory metal, and said shutter means is a circular mask having a radially extending window slot defined therethrough, said shutter being adapted to rotate at constant speed about its radial center with said window slot disposed to permit cyclical alignment between said filament and said ionization pressure gauge.

15. The apparatus according to claim 10 further comprising means for recording: the time of initiation of said desorption time interval; each of said specified times; and the time of occurrence of each of said energy pulses relative to the immediately previous specified time.

16. The apparatus according to claim 10 wherein said analyzer means comprises a mass spectrometer comprising:

means for ionizng at said specified times the molecules desorbed from said body;

means for accelerating molecules so ionized into a magnetic analyzer section of said spectrometer;

means for applying a cyclically varying magnetic field across sadi magnetic analyzer section in synchronism with said specified times to provide output ion current from said magnetic analyzer section having an amplitude as a function of time which depends upon the masses of the molecules accelerated into said magnetic analyzer section, said output ion current corresponding to said energy pulses.

17. The method of determining constituent components of a material to be analyzed comprising the steps of:

selectively desorbing said constituent components of said material from a body on which said material is adsorbed by gradually increasing the temperature of said body as a known function of time over a predetermined desorption time interval and over a temperature range which encompasses the desorption temperatures of said constituent components;

segmenting said desorption time interval into plural sub-intervals of time, each sub-interval corresponding to a respective range of desorption temperatures effected during that sub-interval;

performing an analysis during each sub-interval of time of the masses of constituent components of said material which are desorbed during said each sub- interval of time.

References Cited

UNITED STATES PATENTS 2,659,821 11/1953 Hipple _____ 250—41.9(3)
3,068,402 12/1962 Redhead _____ 324—33

WILLIAM F. LINDQUIST, Primary Examiner

A. L. BIRCH, Assistant Examiner